US006562205B1

(12) United States Patent
Ban et al.

(10) Patent No.: US 6,562,205 B1
(45) Date of Patent: May 13, 2003

(54) HIGH-TEMPERATURE ULTRAPURE WATER PRODUCTION APPARATUS AND LIQUID MEDICINE PREPARATION APPARATUS EQUIPPED WITH THE PRODUCTION APPARATUS

(75) Inventors: Cozy Ban, Tokyo (JP); Kazunori Koba, Osaka (JP); Shoichi Momose, Osaka (JP); Toshinori Iwai, Osaka (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/554,558

(22) PCT Filed: Sep. 18, 1998

(86) PCT No.: PCT/JP98/04214

§ 371 (c)(1),
(2), (4) Date: Jul. 7, 2000

(87) PCT Pub. No.: WO00/17108

PCT Pub. Date: Mar. 30, 2000

(30) Foreign Application Priority Data

Mar. 31, 1997 (JP) .............................................. 9-79277

(51) Int. Cl.[7] .................................................. C02F 1/46

(52) U.S. Cl. ....................................... 204/242; 210/900

(58) Field of Search ......................... 205/742; 210/900; 204/242

(56) References Cited

U.S. PATENT DOCUMENTS 5,470,461 A * 11/1995 Ban et al. .................... 210/188
5,578,193 A * 11/1996 Aoki et al. .................. 205/746
5,833,846 A * 11/1998 Tanabe et al. .............. 210/202

FOREIGN PATENT DOCUMENTS

JP 07-155744 * 6/1995
JP 09-045656 * 2/1997
JP 10-177983 * 6/1998

* cited by examiner

*Primary Examiner*—Arun S. Phasge
(74) *Attorney, Agent, or Firm*—Armstrong, Westerman & Hattori, LLP

(57) ABSTRACT

A high-temperature ultrapure water production apparatus comprises an evaporator 22 for treating pretreated water obtained by a pretreating system or primary pure water obtained by a primary pure water system 21 to prepare ultrapure water having a high temperature, an ion exchanger 23 for removing trace metal ions from the ultrapure water obtained by the evaporator 22, a product water heat exchanger 24 made of titanium for subjecting to heat exchange the high-temperature ultrapure water obtained by the evaporator 22 and containing the trace metal ions unremoved therefrom and the ultrapure water having ordinary temperature and having its trace metal ions removed by treatment by the ion exchanger 23, a cooling heat exchanger 25 made of SUS for cooling to not higher than 40° C. the ultrapure water containing the unremoved trace metal ions and cooled by the product water heat exchanger 24 for use as feed water for the ion exchanger 23.

8 Claims, 10 Drawing Sheets

HIGH-TEMPERATURE ULTRAPURE WATER PRODUCTION APPARATUS AND LIQUID MEDICINE PREPARATION APPARATUS EQUIPPED WITH THE PRODUCTION APPARATUS

TECHNICAL FIELD

The present invention relates to ultrapure water production apparatus for use in electronics industries including the semiconductor industry, and more particuarly to apparatus for producing high-temperature ultrapure water which is remarkably effective for achieving improvements in rinsing efficiency and drying efficiency in cleaning wafers in the semiconductor fabrication process.

The invention relates also to systems for preparing chemical liquids for use in processes for treating semiconductors or other precision devices, especially for use in cleaning semiconductor wafers, and more particularly to chemical liquid preparation systems for use in preparing and supplying chemical liquids having a high temperature.

The term the "chemical liquid" as used herein includes a cleaning liquid for use in the step of cleaning semiconductor wafers and the step of cleaning other precision devices, and a process liquid for use in inhibiting-a natural oxide film on Si surfaces in the step of treating semiconductors.

BACKGROUND ART

Electronics industries including the semiconductor industry in recent years require water purified to a very high degree. The water to be thus treated is usually industrial water, tap water, well water or the like. Such untreated water contains suspended substances, electrolytes, fine particles, microorganisms, organic matter, dissolved oxygen, etc. in amounts greatly in excess of water quality standard values, so that these impurities must be removed.

FIGS. 3 and 4 show known apparatus for preparing ultrapure water by removing these impurities.

Conventional example 1 shown in FIG. 3, i.e., apparatus 71, comprises a primary pure water system 72 for treating untreated water, and a secondary pure water system 73 for treating the primary pure water obtained 20. by the primary pure water system 72 to obtain ultrapure water. The primary pure water system 72 comprises a filter 74, reverse osmosis unit 75, deaerator 76 and ion exchanger 77. The secondary pure water system 73 comprises an ultraviolet sterilizer 78, demineralizer 79 and ultrafiltration (UF) unit 80. The apparatus 71 removes the ionic component from the feed water by the reverse osmosis unit 75, ion exchanger 77 and demineralizer 79 until the water has a very low ionic content, giving ultrapure water having a resistivity, for example, of not lower than 18.0 MÙ·cm. However, the apparatus 71 has the problems of being insufficient in its ability to remove nonionic impurities such as silica and organic matter, encountering difficulty in fully removing dissolved oxygen from the product water, necessitating sterilization as held out of operation because the apparatus 71 is operated at room temperature and therefore inevitably permits development and growth of bacteria, and being complex in construction and cumbersome to monitor during operation because the apparatus comprises many treating devices in combination.

On the other hand, the apparatus of conventional example 2 shown in FIG. 4 is adapted to completely remove nonionic impurities, such as silica and organic colloids, and dissolved oxygen and to produce ultrapure water having a high temperature suitable for achieving improvements in rinsing efficiency and drying efficiency.

The apparatus of conventional example 2 consists mainly of a multi-effect evaporator I for treating primary pure water obtained by a primary pure water system to prepare high-temperature pure water and has an ultrafiltration (UF) unit 2 downstream from the evaporator. The primary pure water system is the same as the one included in the apparatus of conventional example 1. The primary pure water fed to the evaporator I is led into a preheating tube 5 extending vertically through each of effects within the evaporator I and heated with the latent heat of condensation of a portion of water vapor produced in evaporation tubes 7 of each effect. The feed water in the preheating tube 5 within the first effect is heated to a predetermined temperature of about 100° C. by receiving the latent heat of condensation of part of heating steam and enters a water reservoir 13 in the bottom of the first effect. The feed water in the reservoir 13 becomes mixed with the concentrate remaining in the evaporation tubes 7 after releasing water vapor, and a major portion of the mixture is led by a circulating pump 6 to the evaporation tubes 7 arranged at an upper portion of the first effect to flow down the interior of the tubes in the form of a thin film and evaporates at a temperature of about 100° C. by receiving the latent heat of condensation of a major portion of the heating steam from outside the tubes to produce water vapor. The concentrate resulting from production of the water vapor flows down into the reservoir 13 and becomes mixed with feed water as described above. A major portion of the mixture is sent to an upper water chamber 15 by the circulating pump 6. The remainder of the mixture flows through a communication opening 14 into the water reservoir of the second effect, in which the mixture similarly becomes mixed with the concentrate flowing down the evaporation tubes. A major portion of the resulting mixture is sent to a water chamber in the upper portion of the second effect by a circulating pump.

The water vapor produced in the evaporation tubes in the first effect flows through a demister 16 into a space around evaporation tubes in the second effect. The mist entrained in the water vapor is removed by the demister 16, remaining only in a very small amount. A major portion of the water vapor condenses on the outer surfaces of the evaporation tubes, and the condensate enters a condensate collector (not shown) in the second effect, while the remaining portion of the water vapor condenses on the outer surface of the preheating tube in the second effect. In the condensate collector, the resulting condensate becomes mixed with the condensate from the evaporation tubes, and the mixture entirely enters a condensate collector in the third effect.

In this way, the above process is repeated in every effect.

The water vapor produced by evaporation in the final effect (nth effect) flows through a demister and condenses on the outer surface of a condensation tube 12 of a condenser 1, and the condensate enters a water reservoir 11 below the condenser. The whole condensate produced in each effect flows through the condensate collector and similarly enters the water reservoir 11. The condensate collected in the reservoir 11 is drawn off by an ultrapure water pump 10 and passed through the ultrafiltration unit 2 chiefly intended for the removal of fine particles.

The condensate drawn off by the pump 10 and made free from fine particles by the ultrafiltration membrane 2 is ultrapure water having a high temperature and a resistivity of at least 18.0 MÙ·cm (measured when the pure water of high temperature is cooled to 25° C.; all the resistivities herein referred to are values measured at 25° C.), a value very close to the resistivity of theoretical pure water, and very low in TOC value and in dissolved oxygen concentration. For use in cleaning wafers in the semiconductor fabrication process, it is especially desirable that the high-temperature ultrapure water have a temperature of about 70 to 80° C. when to be effective for achieving remarkably improvements in rinsing efficiency and drying efficiency.

As shown in FIG. 5, many chemical liquids are used at high temperatures for cleaning wafers in the semiconductor fabrication process. These chemical liquids are replaced batchwise, such that when used for treating a specified number of wafers, the chemical liquid is drawn off from the cleaning container, followed by supply of a predetermined amount of fresh chemical liquid to the container.

The chemical liquid is conventionally prepared and supplied by such a method that the ultrapure water produced by the apparatus of conventional example 1 and a chemical are supplied in respective specified amounts directly to the cleaning container and then heated to a predetermined temperature by an electric heater. Alternatively, the ultrapure water produced by the apparatus of conventional example 1 and a chemical are supplied in respective specified amounts to a chemical preparation container and then heated to a predetermined temperature by an electric heater to prepare a chemical liquid in advance, and the solution is supplied from the container to the cleaning container when required. The chemical is supplied by an automatic feeder which uses nitrogen gas for forced feeding, or a pump.

With the high-temperature ultrapure water apparatus of conventional example 2 described, a metal material, such as SUS316 or SUS304, is used for evaporation tubes and like components of the apparatus so as to ensure high thermal conductivity for heat exchange. To prevent metal ions from dissolving out into the condensate from the metal material, the portion of the material to be exposed to the condensate is treated by electrolytic combination polishing and then treated in a high-temperature oven to positively form an oxide film over the material surface. The apparatus of conventional example 2 requires such treatment and therefore has the problem of necessitating a complex process for constructing the apparatus and being costly to make.

Incidentally, if the dissolving-out preventing treatment is not performed in fabricating the high-temperature ultrapure water apparatus of conventional example 2, it has been found that the high-temperature ultrapure water obtained contains metal ions, i.e., about 50 ppt of Fe and about 10 ppt of Ni. With the semiconductor fabrication process, it is thought unacceptable that not less than $1\times10^{10}$ atoms/cm$^2$ of metal ions be present on the wafer surface. An investigation was made on the relationship between the concentration of trace metal ions in pure water and the quantity of wafer surface contaminant in the case where such a measure was not taken for removing the trace metal ions. The result is given in Table 1. (The method of measurement will be described later.)

TABLE 1

Relationship between the metal ion concentration of pure water containing unremoved trace metal ions and the quantity of wafer surface contaminant

| Table 1 Test method Water used | Temp. ° C. | Fe concn. of pure water ppt | Quantity of Fe on wafer surface × $10^{10}$ atoms/cm$^2$ |
|---|---|---|---|
| Immersion | 30 | 55 | 3.80 |
| Ord.-temp. pure water | 31 | 49 | 1.57 |
| Immersion | 68 | 67 | 8.64 |
| High-temp. pure water | 68 | 57 | 7.30 |

Table 1 reveals the problem that the pure water containing trace metal ions remaining therein unremoved contains 49 to 67 ppt of Fe ions, permitting adhesion of $1.57–8.64\times10^{10}$ atoms/cm$^2$ of Fe ions to the wafer surface to contaminate the surface, and that the quantity of contaminant increases at a higher temperature.

Ultrapure water having a high temperature and a low dissolved oxygen concentration not only washes away chemical liquids but is also effective for device processing, for example, in inhibiting the natural oxide film on Si surfaces, etching such surfaces and removing metal impurities from natural oxide film surfaces as is already known. However, in the case where the high-temperature ultrapure water production apparatus of conventional example 2 is built without performing the metal ion dissolving-out preventing treatment, the water produced contains trace metal ions which would give rise to the problem of contaminating wafer surfaces. Accordingly, the apparatus is not usable free of problems in actually fabricating cutting-edge devices.

The batchwise method of replacing the chemical liquid encounters the following problems in cleaning wafers in the semiconductor fabrication process.

There must be a period of time for the replacement of chemical liquid which includes time for drawing off the used solution, time for supplying a fresh liquid and time for temperature adjustment, and further there is a need to provide a period of time for sending out wafers from the cleaner before the liquid replacement so that no wafer remains therein. Thus the cleaning operation is interrupted during the combined period of time to entail a lower production efficiency.

Wafers can be cleaned effectively immediately after the replacement, whereas wafers are cleaned less effectively immediately before the replacement than those cleaned immediately thereafter. This creates variations in the finish of products and in the performance of products.

DISCLOSURE OF THE INVENTION

An object of the present invention is to provide an apparatus for and a method of producing high-temperature ultrapure water which is much smaller in the amounts of silica, organic matter and dissolved oxygen than the water produced by the apparatus of conventional example 1 and which need not be sterilized for the control of bacteria, the apparatus being simple in construction and easy to monitor during operation and to maintain, and eliminating the need involved in the apparatus of conventional example 2 for the treatment including electrolytic combination polishing and high-temperature oven treatment for preventing metal ions from dissolving out to thereby assure the apparatus of a simplified production process and render the apparatus less costly to make.

Another object of the invention to provide a system for and a method of preparing a chemical liquid which is usable in an unaltered state for cleaning wafers in the semiconductor fabrication process to thereby eliminate variations in the quality of products due to variations in the state of the chemical liquid. Still another object of the invention is to provide a system for and a method of preparing a chemical liquid which make it possible to use ultrapure water having a high temperature and a low dissolved oxygen concentration as a process liquid.

The present invention provides a high-temperature ultrapure water production apparatus comprising an evaporator for treating pretreated water obtained by direct filtration and deaeration or primary pure water obtained by a primary pure water system to prepare ultrapure water having a high temperature, and an ion exchanger for removing trace metal ions from the ultrapure water obtained by the evaporator.

The primary pure water system of the apparatus of the invention may be the same as the one included in conventional example 1, and comprises a filter, reverse osmosis unit, deaerator and ion exchanger. Depending on the quality of the feed water for the apparatus of the invention, the primary pure water system may be replaced by a pretreating system comprising a direct filter and a deaerator.

The evaporator may be the same as the one included in conventional example 2, and consists mainly of the multi-effect evaporator I for treating the pretreated water obtained by the pretreating system or the primary pure water obtained by the primary pure water system to prepare high-temperature pure water, the evaporator being provided with an ultrafiltration (UF) unit 2 downstream therefrom when so required. The evaporator is operated at a high temperature of about 100° C. However, the metal material for making the evaporator need not be treated for preventing dissolving-out of metal ions.

Preferably, the ion exchanger is packed with a mixed-bed ion exchange resin or strongly acidic cation exchange resin. These mixed-bed ion exchange resin and strongly acidic cation exchange resin preferably have heat resistance. The mixed-bed ion exchange resin is a mixture of a strongly acidic cation exchange resin and a strongly basic anion exchange resin as mixed together and packed in a required exchange volume ratio. The high-temperature ultrapure water obtained by the evaporator is fed to the ion exchange resin, as held at a high temperature or as cooled to not higher than 40° C. by a product water heat exchanger and a cooling heat exchanger. The mixed-bed ion exchange resin is, for example, a mixture of a strongly acidic cation exchange resin and a strongly basic anion exchange resin as mixed together and packed in an exchange volume ratio of 1:1, e.g., Ion Exchange Resin SMT100 manufactured by Mitsubishi Chemical Corp. Further the strongly acidic cation exchange resin is, for example, Ion Exchange Resin SKT10 manufactured by Mitsubishi Chemical Corp.

The ion exchanger may be packed with an ion exchange membrane or ion exchange fiber instead of the ion exchange resin. Preferable as the ion exchange membrane and the ion exchange fiber are those having heat resistance.

Further the ion exchanger may comprise an electric deionizing unit of the continuous water passage type.

The ion exchanger which is an electric deionizing unit of the continuous water passage type need not be brought out of operation for regenerating the ion exchange resin and can therefore be operated completely continuously. FIGS. 6 to 8 show electric deionizing units of the continuous water passage type. The deionizing unit 50 shown in FIG. 6 has a channel 52 for the water to be treated which channel is formed by a cation exchange membrane 53 and an anion exchange membrane 54 and packed with a cation exchange resin 55 and an anion exchange resin 56, an anion exchange membrane 57 disposed outside the cation exchange resin 53 to form a concentrate channel 59, and a cation exchange membrane 58 outside the anion exchange membrane 54 to form a concentrate channel 59. Continuous ion exchange can be realized by applying an electric field to the unit externally of the concentrate channels 59. An example of such unit is CDI, product of Kurita Water Industries, Ltd. The unit 51 shown in FIG. 7 corresponds to the unit 50 of FIG. 6 wherein all the channels 52, 59 are packed with ion exchange resins 55, 56, and the central channel serves as a concentrate channel 59, with the outer channels serving as channels 52 for the water to be treated. An example of such unit is a new model of CDI, product of Kurita Water Industries, Ltd. The unit 61 shown in FIG. 8 has a channel 62 for the water to be treated which channel is formed by a cation exchange membrane 63 and an anion exchange membrane 64 and packed with a cation exchange fiber 65 and an anion exchange fiber 66. An example of such unit is New Codes, product of Nihon Rensui Co., Ltd. The ion exchange elements of electric deionizing units of the continuous water passage type are preferably ion exchange resins and ion exchange fibers each having heat resistance.

With the high-temperature ultrapure water production apparatus of the present invention, the feed water (industrial water or municipal water) is first treated by the pretreating system or primary pure water system to remove suspended substances, electrolytes, fine particles, microorganisms, etc. from the feed water. However, the treatment by the pretreating system or primary pure water system only fails to fully remove nonionic impurities, such as silica and organic matter, and dissolved oxygen. For the purpose of removing these, the pretreated water or primary pure water is fed to the evaporator for treatment. The pure water production process of the evaporator involves a phase change and bleeding procedure, so that silica, organic substances and like nonionic impurities and dissolved oxygen and like dissolved gases can be thereby separated off and removed to greatly reduce these impurities in the water to trace quantities. Since the evaporator is operated at a high temperature of about 100° C., the evaporator is free from live cells and need not be sterilized for the control of bacteria. The evaporator is not treated over the liquid contact portion thereof for preventing dissolving-out of metal ions as by electrolytic combination polishing or forced oxide film treatment in a high-temperature oven, so that the high-temperature ultrapure water obtained by the evaporator will contain trace metal ions, which nevertheless are removed by the mixed-bed ion exchange resin or strongly acidic cation exchange resin of the ion exchanger. The ultrapure water having a high temperature and thus prepared is used, for example, for cleaning wafers.

The high-temperature ultrapure water production apparatus of the invention is more simple in construction and easier to maintain and monitor the operation thereof than the apparatus of conventional example 1 having a secondary pure water system comprising an ultraviolet sterilizer, demineralizer and ultrafiltration unit. The present apparatus is more simple in fabrication process and lower in manufacturing cost than the apparatus of conventional example 2 since the evaporator need not be treated for preventing dissolving-out of metal ions by electrolytic combination polishing and forced oxide film treatment in an oven of high temperature.

In quality, the pure water obtained by the evaporator is equivalent to or higher than the ultrapure water to be used for cleaning wafers in the semiconductor fabrication process except that the water contains trace quantities of metals (Fe and Ni), e.g., about 50 ppt of Fe and about 10 ppt of Ni. This greatly prolongs the life of the mixed-bed ion exchange resin or strongly acidic cation exchange resin for treating the water, making it possible to produce high-temperature ultrapure water which is usable free of trouble for cleaning wafers in the semiconductor fabrication process without entailing an increase in cost.

Preferably the high-temperature ultrapure water production apparatus of the invention further comprises a product water heat exchanger for subjecting to heat exchange the high-temperature ultrapure water obtained by the evaporator and containing the trace metal ions unremoved therefrom and the ultrapure water having ordinary temperature and having its trace metal ions removed by treatment by the ion exchanger, to thereby cool the high-temperature ultrapure water containing the unremoved trace metal ions before feeding to the ion exchanger and heat the ordinary-temperature ultrapure water made free from the trace metal ions. The mixed-bed ion exchange resin and strongly acidic cation exchange resin to be packed in the ion exchanger then need not be highly resistant to heat, while the recovery of heat effected by the product water heat exchanger results in a reduced heat loss.

Further preferably, the high-temperature ultrapure water production apparatus further comprises a cooling heat exchanger for cooling to not higher than 40° C. the ultrapure water containing the unremoved trace metal ions and cooled by the product water heat exchanger for use as feed water for the ion exchanger. This ensures that the ultrapure water to be introduced into the ion exchanger can be cooled to not higher than the specified temperature.

The heat exchangers described are so positioned that the evaporator, product water heat exchanger, cooling heat exchanger and ion exchangers are arranged from an upstream position downstream in this order. The heat exchanger can be those made from a fluorocarbon resin, such as PFA or PVDF, which is less likely to dissolve out and which is used for conventional heat exchangers for ultrapure water.

In the case where a metal material is used for the product water heat exchanger, the exchanger is used in a high temperature range which imposes a stringent requirement as to the dissolving-out of the metal material into the pure water, while the exchanger serves to heat the ultrapure water having ordinary temperature and made free from the trace metal ions. It is accordingly desirable that the material to be used be titanium which is most unlikely to dissolve out among the metals, oxidation-passivated stainless steel obtained by electrolytic polishing and subsequent special heat treatment or oxidation-passivated stainless steel obtained by electrolytic combination polishing and subsequent special heat treatment. The oxidation-passivated stainless steel obtained by electrolytic polishing and subsequent special heat treatment is, for example, GOLD EP WHITE, a product of Shinko Pantekku Co., Ltd.

In the case where the product water heat exchanger is made of titanium, oxidation-passivated stainless steel obtained by electrolytic polishing and subsequent special heat treatment or oxidation-passivated stainless steel obtained by electrolytic combination polishing and subsequent special heat treatment, and the cooling heat exchanger is made from stainless steel, trace quantities of metal ions, if dissolving out from the stainless steel exchanger, are removed by the ion exchanger, and the ultrapure water made free from the trace metal ions is thereafter heated by the product water heat exchange from which little or no metal dissolves out, with the result that the high-temperature ultrapure water eventually obtained remains free of degradation. Further the heat exchanger of metal material has greater thermal conductivity and is easier to make by machining than those used for ultrapure water and made from a fluorocarbon resin, such as PFA or PVDF, which is used conventionally, hence the advantage of being compact and inexpensive to make.

When a metal material is used for the cooling heat exchanger, this exchanger is used in a medium temperature range involving a less stringent requirement as to the dissolving out of the metal material and serves to cool the ultrapure water before passage through the ion exchanger, so that it is desired to use a metal material which is equivalent to or smaller in the quantity of material dissolving out into the pure water. The metal material to be used for the cooling heat exchanger is, for example, stainless steel, titanium, oxidation-passivated stainless steel obtained by electrolytic polishing and subsequent special heat treatment or oxidation-passivated stainless steel obtained by electrolytic combination polishing and subsequent special heat treatment.

The high-temperature ultrapure water obtained by the apparatus described above is of course used as it is for rinsing in the treating steps of the semiconductor fabrication process shown in FIG. 5, while using a chemical liquid preparation system of the invention, the water can be made into electrolytic ionized water or mixed with a chemical agent, such as $NH_4OH$, $H_2O_2$, HCl, HF, $H_2SO_4$ or $HNO_3$, to prepare a chemical solution for uses, other than rinsing, in treating steps of the semiconductor fabrication process. (The term "chemical agent" is to be interpreted as including not only a chemical but also a material gas or oxidizing gas.)

The present invention provides a chemical liquid preparation system comprising a high-temperature ultrapure water production apparatus according to the invention, an electrolytic ionized water production device for decomposing the high-temperature ultrapure water obtained by the production apparatus into electrolytic anode water and electrolytic cathode water, and a feeder for supplying the anode water and the cathode water directly to chemical liquid tanks of apparatus for treating semiconductors or other precision devices. The high-temperature ultrapure water is passed as it is through the electrolytic ionized water production device, thereby giving high-temperature electrolytic ionized water (electrolytic anode water and electrolytic cathode water). The electrolytic anode water and the electrolytic cathode water are supplied to different chemical liquid tanks. The electrolytic ionized water production device is, for example, one having the structure of a three-cell electrolytic device, product of Organo Corp. Preferably, the ion exchange membrane or ion exchange resin for use in the three-cell electrolytic device is one having heat resistance. The chemical liquid production system affords electrolytic ionized water having a high temperature and more effective cleaning properties than those of low temperature, consequently shortening the cleaning time needed and permitting use of a smaller amount of chemical liquid.

The present invention provides a chemical liquid preparation system comprising a high-temperature ultrapure water production apparatus according to claims 1 to 9, and a chemical liquid feeding-adjusting device for supplying the high-temperature ultrapure water obtained by the production apparatus and a chemical agent to be mixed with the high-temperature ultrapure water directly to a chemical liquid tank of an apparatus for treating semiconductors or other precision devices, the feeding-adjusting device further being operable to adjust a chemical liquid in the tank to a desired temperature or concentration (see FIG. 12). To give the desired concentration to the chemical liquid in the chemical liquid tank, the system includes, for example, a water feeder for supplying the high-temperature ultrapure water at a constant rate, and an automatic chemical feeder. The water feeder is provided with an indicating controller, flowmeter giving an output and automatic control valve. The automatic chemical feeder has a chemical tank, indicating controller, flowmeter giving an output, automatic control value, etc. For example, a heat exchanger is further provided so as to give the desired temperature to the chemical liquid in the chemical liquid tank.

The present invention provides a chemical liquid preparation system comprising a high-temperature ultrapure water production apparatus, and a mixing device for mixing a chemical agent with the high-temperature ultrapure water obtained by the production apparatus. For example, a mixer is used as the mixing device. To give a desired concentration to the chemical liquid in the mixer, the system includes, for example, above-mentioned water feeder for supplying the high-temperature ultrapure water at a constant rate, and automatic chemical feeder (see FIGS. 10 and 11). To give a desired temperature to the chemical liquid as placed in a chemical liquid tank, a heat exchanger, for example, is provided between the tank and the mixer (see FIG. 10). The mixer may be disposed in the vicinity of the high-temperature ultrapure water production apparatus, or in the vicinity of the chemical liquid tank. A gas feeder (not shown) may be provided in place of the automatic chemical feeder for mixing HCl, $NH_3$, HF, $NH_4F$, $SO_x$, $NO_x$ or like material gas or $O_3$, $O_2$, oxygen radical or like oxidizing gas with the high-temperature ultrapure water obtained by the production apparatus.

The chemical liquid obtained by the preparation system is supplied to the chemical liquid tank by a method wherein the chemical liquid, as given the desired concentration and desired temperature, is supplied to the tank batchwise, or by continuously supplying the chemical liquid, as given the desired concentration and temperature, to the tank at a predetermined rate and drawing off the liquid from the tank at a rate equal to the supply rate.

In the case where the method used comprises continuously supplying the chemical liquid of the desired concentration and temperature to the tank at a predetermined rate and drawing off the liquid from the tank at a rate equal to the supply rate, the liquid in the tank becomes unaltered in properties. This eliminates variations in the quality of products due to variations in the properties of the chemical liquid, consequently attaining an improved yield, further permitting a continuous operation to eliminate cleaning interruption time and resulting in an increased operation time to achieve higher productivity.

Even when the chemical liquid as adjusted to the desired concentration and desired temperature is supplied batchwise to the tank, the time taken for heating the liquid to the desired temperature can be shorter than when ultrapure water of room temperature is supplied as conventionally practiced since the pure water to be supplied has a high temperature.

BEST MODE OF CARRYING OUT THE INVENTION

Embodiment of high-temperature ultrapure water production apparatus of the present invention will be described below with reference to FIGS. 1 and 2. However, the invention is not limited to these embodiments.

Figure 1:
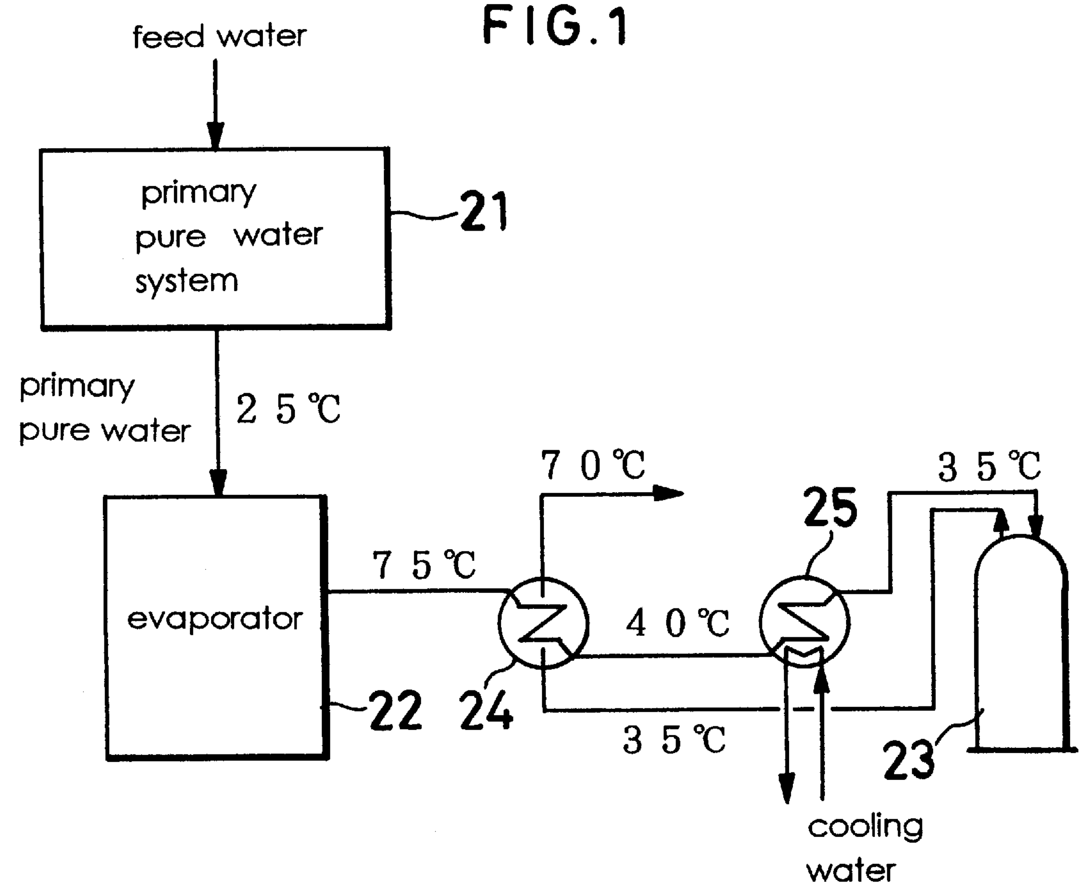
FIG. 1 is a flow chart showing a first embodiment of high-temperature ultrapure water production apparatus of the invention.

FIG. 1 shows a first embodiment of high-temperature ultrapure water production apparatus of the invention. As shown in the drawing, the apparatus comprises a primary pure water system 21 for treating industrial water or municipal water (tap water) as feed water to obtain primary pure water, a multi-effect evaporator 22 for treating the primary pure water obtained by the system 21 to prepare high-temperature ultrapure water, an ion exchanger 23 for removing trace metal ions from the water obtained by the evaporator 22, and a product water heat exchanger 24 and a cooling heat exchanger 25 which are arranged between the evaporator 22 and the ion exchanger 23.

Figure 3:
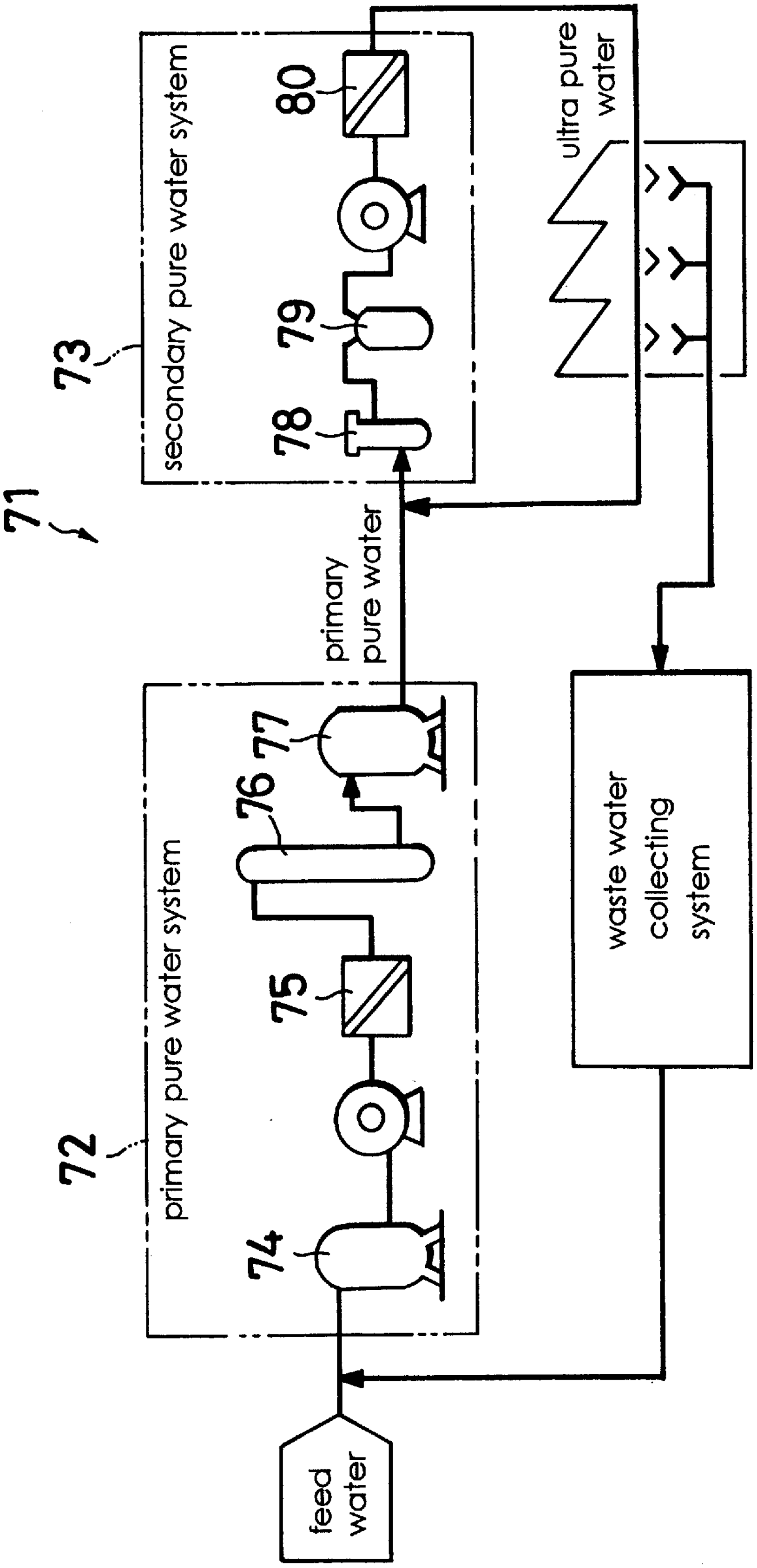
FIG. 3 is a flow chart showing a conventional ultrapure water production apparatus.

The primary pure water system 21 comprises a filter, reverse osmosis unit, deaerator and ion exchanger (see FIG. 3) for treating feed water, i.e., industrial water or municipal water (tap water) supplied thereto at room temperature (e.g., 25° C.) to obtain primary pure water of ordinary temperature and supply the water to the evaporator 22. In the primary pure water system 21, suspended substances are removed mainly by the filter, electrolytic (ionic) substances by the reverse osmosis unit and the ion exchanger, and dissolved oxygen by the deaerator to obtain pure water having a resistivity of 17.5 MÙ·cm and containing about 0.1 ppb (100 ppt) of trace metal ions, 30 ppb of TOC, 3 ppb of silica ($SiO_2$) and 50 ppb of dissolved oxygen.

The ion exchanger 23 is packed with a strongly acidic cation exchange resin (Ion Exchange Resin SKT10, product of Mitsubishi Chemical Corp.).

Figure 4:
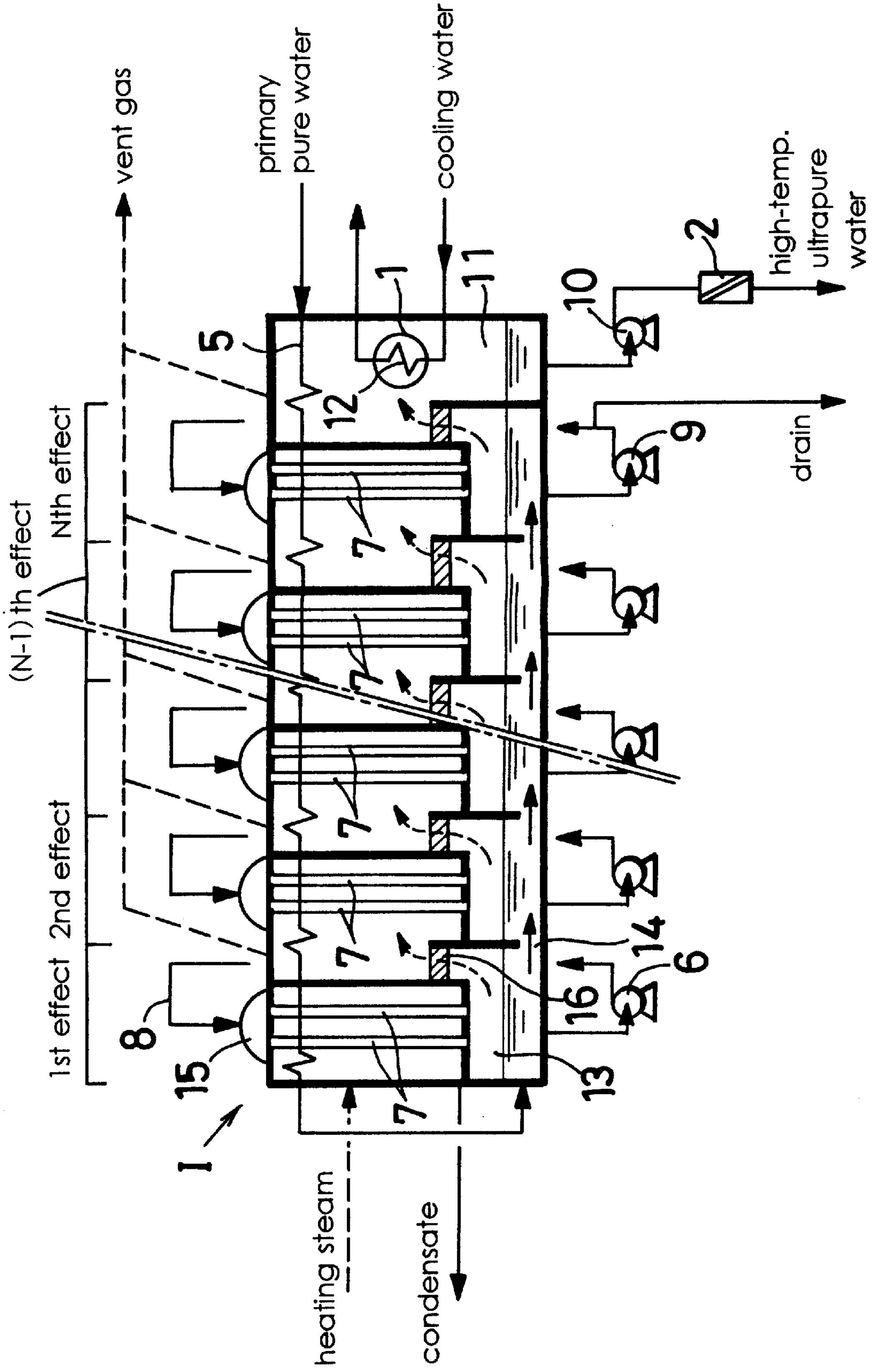
FIG. 4 is a flow chart showing a conventional high-temperature ultrapure water production apparatus.
Figure 5:
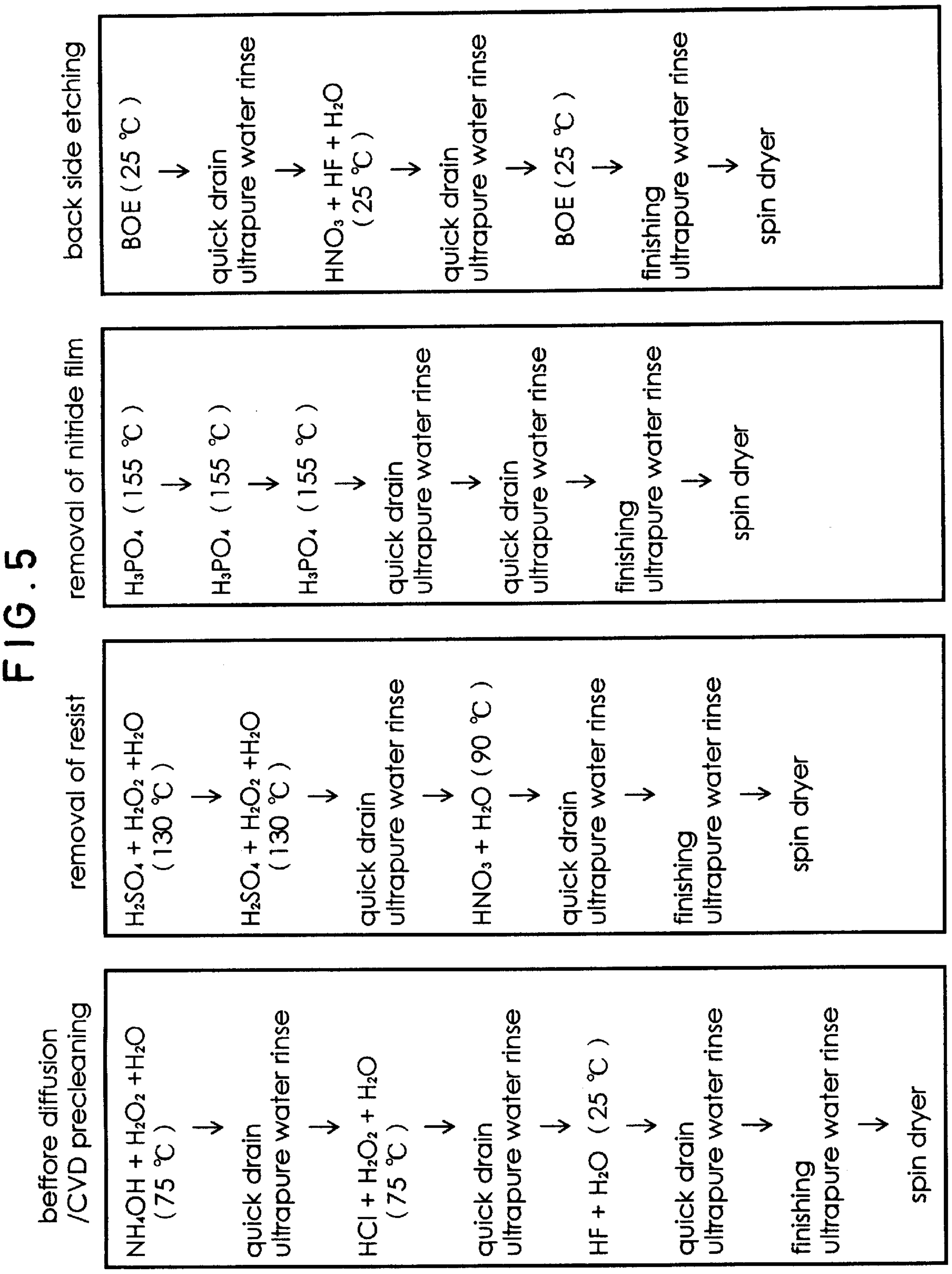
FIG. 5 is a diagram showing examples of treating steps of a semiconductor process.
Figure 6:
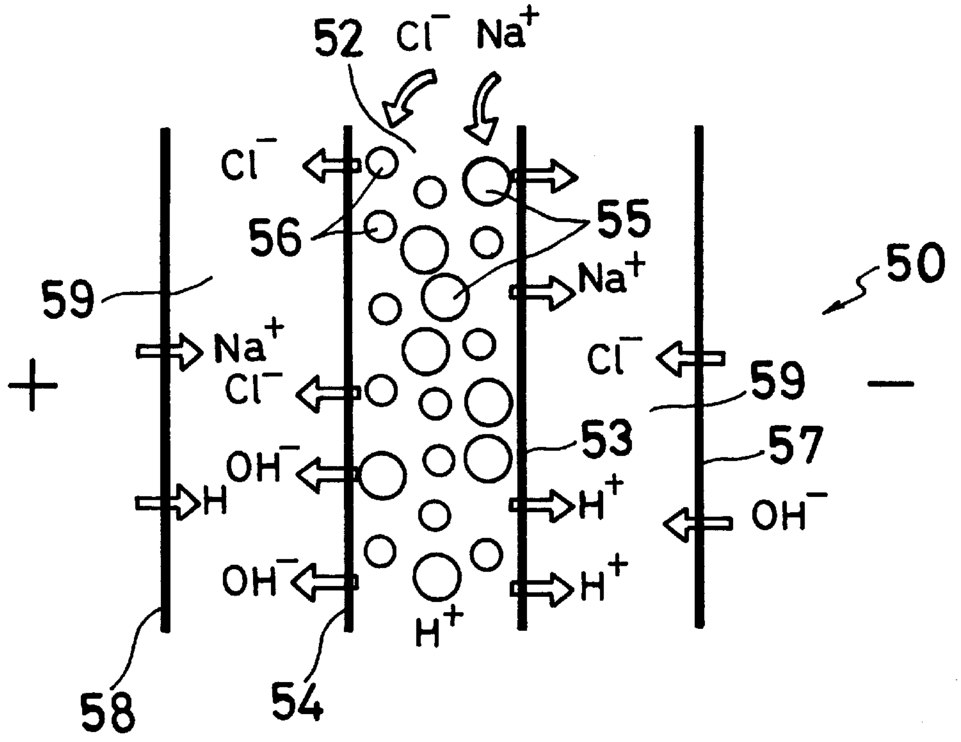
FIG. 6 is a diagram showing an example of electric deionizing device of the continuous water passage type.
Figure 8:
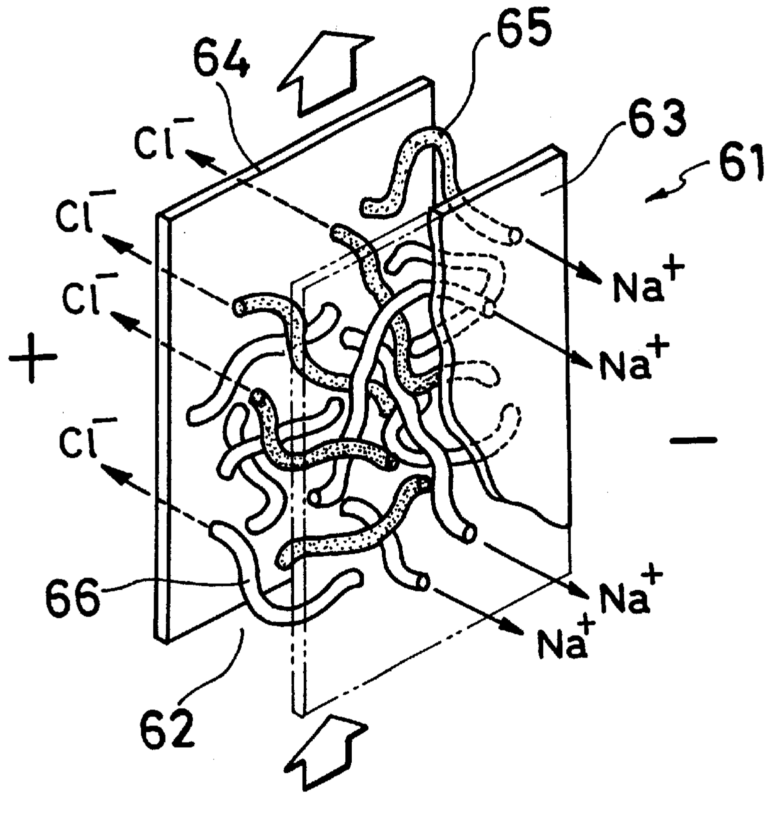
FIG. 8 is a diagram showing another example of electric deionizing device of the continuous water passage type.
Figure 7:
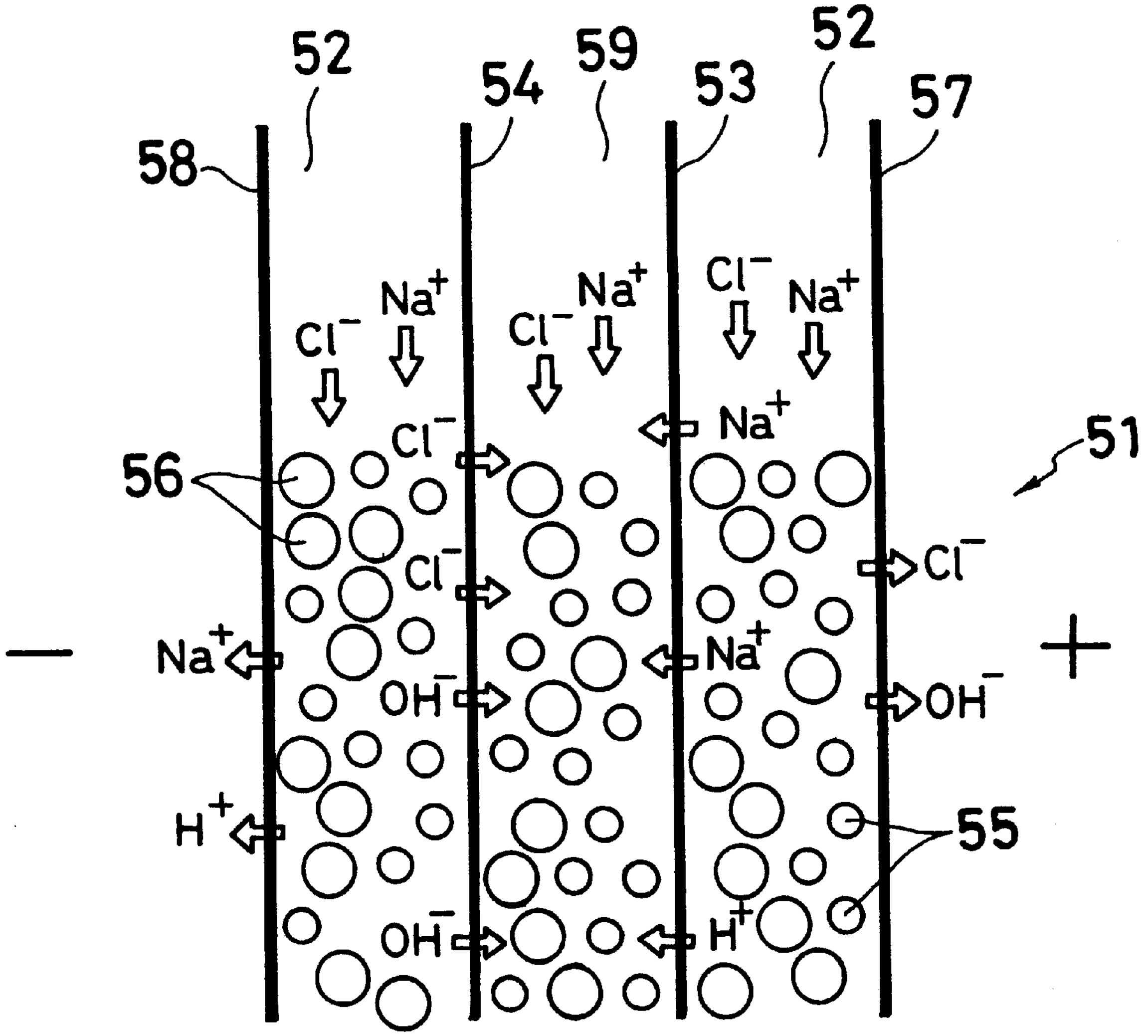
FIG. 7 is a diagram showing another example of electric deionizing device of the continuous water passage type.

The evaporator 22 has the same construction as the one included in conventional example 2 and shown in FIG. 4, and consists mainly of a multi-effect evaporator for treating the primary pure water obtained by the primary pure water system to prepare high-temperature ultrapure water. However, the metal materials for making the evaporator are not treated for preventing dissolving-out of metal ions. The primary pure water is supplied to the evaporator 22, whereby ultrapure water having a high temperature of about 75° C. is obtained through the same process as in conventional example 2. As shown in Table 2, the water obtained is high-temperature ultrapure water having a very high purity with the exception of containing trace metal ions (Fe ions and Ni ions) of the constituent metal materials of the evaporator.

TABLE 2

Result of analysis of the quality of ultrapure water from the high-temperature ultrapure water production apparatus not treated for preventing metals from dissolving out

| Item of analysis | Unit | Untreated apparatus outlet | Analysis method or device |
|---|---|---|---|
| Resistivity | MΩ · cm | >18.10 | AC two-electrode method, high-sensitivity resistivity meter, Model AQ-11 |
| TOC | μg/l | <3.0 | UV-oxidation-conductivity detecting method, ANATEL TOC meter |
| Number of live cells | cfu/1 | 0 | MF method, 30° C. × 7 days |
| Dissolved oxygen | μg/l | <1.0 | Polarographic method, Model 2713 |
| Na | ng/l | <1 | ICP-MS SPQ-8000 (high-sensitivity spec.) |
| Ca | ng/l | <5 | ICP-MS SPQ-8000 (high-sensitivity spec.) |
| Fe | ng/l | 59 | ICP-MS SPQ-8000 (high-sensitivity spec.) |
| Ni | ng/l | 14 | ICP-MS SPQ-8000 (high-sensitivity spec.) |
| Cl | μg/l | <0.01 | Ion chromatographic concentration method, A-20101 |
| $SO_4$ | μg/l | <0.01 | Ion chromatographic concentration method, A-20101 |
| $SiO_2$ | μg/l | <0.01 | Flame atomic absorptiometric method, 5100 |

Note) pg/l: ppb, ng/l: ppt

The high-temperature ultrapure water obtained by the evaporator 22 is sent into a high-temperature fluid inlet of the product water heat exchanger 24, cooled in the exchanger to about 40° C., then sent into a high-temperature fluid inlet of the cooling heat exchanger 25, further cooled to about 35° C. in this exchanger and thereafter passed through the ion exchanger 23. The trace metal ions (Fe ions and Ni ions) contained in the high-temperature ultrapure water obtained by the evaporator 22 are removed by the ion exchanger 23. The ultrapure water flowing through the ion exchanger 23 has an ordinary temperature of 35° C. and resistivity of at least 18.0 MΩ·cm and contains up to 5 ppt of trace metal ions. The ultrapure water of ordinary temperature is sent into a low-temperature fluid inlet of the product water heat exchanger 24, in which the water recovers heat from the ultrapure water having a high temperature of 75° C. and obtained by the evaporator 22, and flows out of a low-temperature outlet as high-temperature ultrapure water, 70° C. in temperature, at least 18.0 MΩ·cm in resistivity and up to 5 ppt in trace metal ion content. The water is sent to a use point as high-temperature ultrapure water for cleaning wafers.

Cooling water, for example, from a cooling tower is supplied to the low-temperature side of the cooling heat exchanger 25. The cooling water may be cold water from a chiller. The ultrapure water containing trace metal ions unremoved therefrom and cooled to an intermediate temperature of 30 to 45° C. in the product water heat exchanger 24 is further cooled by the cooling heat exchanger 25. When the ion exchange resin packed in the ion exchanger 23 is not resistant to heat, the water containing the unremoved metal ions preferably has a temperature of up to 40° C. before passage through the ion exchanger 23. The cooling heat exchanger 25 provided ensures this temperature. In the case where the water containing the unremoved metal ions and passing through the product water heat exchanger 24 has a temperature not higher than the heat-resisting temperature of the ion exchange resin, the cooling heat exchanger 25 need not be provided.

In the apparatus described, the product water heat exchanger 24 is made of titanium, and the cooling heat exchanger 25 of SUS316.

The ultrapure water to be passed through the cooling heat exchanger 25 has been cooled by the product water heat exchanger 24 and is in the range of medium temperatures which will not readily permit the metal material to dissolve out, such that even if the exchanger 25 is made of SUS316, trace metal ions are almost unlikely to dissolve out into the water. Furthermore, even if trace metal ions dissolve out into the ultrapure water from the exchanger 25, the water subsequently passes through the ion exchanger 23, so that no problem arises from the dissolved-out metal ions. Accordingly examples of metal materials which appear useful for the cooling heat exchanger 25 are those which are equivalent to or less than stainless steel in the quantity of dissolving out metal, e.g., SUS316, SUS316L, SUS304, SUS304L, other stainless steels equivalent to these in dissolving-out characteristics, titanium, oxidation-passivated stainless steel obtained by electrolytic polishing and subsequent special heat treatment, oxidation-passivated stainless steel obtained by electrolytic combination polishing and subsequent special heat treatment, etc.

On the other hand, the product water heat exchanger 24 is used in a high temperature range strictly preventing the metal material from dissolving out. Furthermore, the ultrapure water passed through this exchanger 24 and resulting from the removal of trace metal ions is used as it is for cleaning. The exchanger 24 is therefore a heat exchanger of titanium from which metal ions are almost unlikely to dissolve out so as to prevent degradation of the high-temperature ultrapure water eventually obtained. Besides titanium, examples of metal materials which appear useful are oxidation-passivated stainless steel obtained by electrolytic polishing and subsequent special heat treatment, oxidation-passivated stainless steel obtained by electrolytic combination polishing and subsequent special heat treatment, etc.

An analysis was made of the quality of water at the outlet (35° C.) of the ion exchanger 23 of the high-temperature ultrapure water production apparatus of the invention and at the outlet (70° C.) of the product water heat exchanger 24 made of titanium and included in the apparatus. Table 3 shows the result.

TABLE 3

Result of analysis of the quality of ultrapure water treated for removing trace metal ions

| Item of analysis | Unit | Cation resin outlet (35° C.) | Ti exchanger outlet (70° C.) | Analysis method or device |
|---|---|---|---|---|
| Resistivity | MQ · cm | >18.10 | >18.10 | AC two-electrode method. high-sensitivity resistivity meter, Model AQ-11 |
| TOC | μg/l | <3.0 | <3.0 | UV-oxidation-conductivity detecting method. ANATEL TOC meter |
| Number of live cells | cfu/l | 0 | 0 | MF method, 30° C. 7 days |
| Dissolved oxygen | μg/l | <1.0 | <1.0 | Polarographic method, Model 2713 |
| Na | ng/l | <1 | <1 | ICP-MS SPQ-8000 (high-sensitivity spec.) |
| Ca | ng/l | <5 | <5 | ICP-MS SPQ-8000 (high-sensitivity spec.) |
| Fe | ng/l | <1 | 2 | ICP-MS SPQ-8000 (high-sensitivity spec.) |
| Ni | ng/l | <1 | <1 | ICP-MS SPQ-8000 (high-sensitivity spec.) |
| Cl | μg/l | <0.01 | <0.01 | Ion chromatographic concentration method, A-20101 |
| $SO_4$ | μg/l | <0.01 | <0.01 | Ion chromatographic concentration method, A-20101 |
| $SiO_2$ | μg/l | <0.01 | <0.01 | Flame atomic absorptiometric method, 5100 |

The ultrapure water obtained by the apparatus of the invention was used for an immersion test, and also tested for contamination, simulating the wet cleaning step practiced in fabricating semiconductors. The surfaces of the wafers tested were analyzed. Table 4 shows the result.

TABLE 4

Relationship between the metal ion concentration of pure water treated for removing trace metal ions and the quantity of contaminant on wafer surfaces

| Pure water tested | Temp. ° C. | Fe concn. of pure water ppt | Quantity of Fe on wafer surface $\times 10^{10}$ atoms/cm$^2$ |
|---|---|---|---|
| Pure water immersion ord.-temp. rinse | 30 | <1 | 0.34 |
| RCA ord.-temp. rinse | 33 | <1 | 0.30 |
| RCA + HF ord.-temp. rinse | | | 0.42 |
| RCA high-temp. rinse | 68 | 2 | 0.29 |
| RCA + HF high-temp. rinse | | | 0.40 |

Table 4 reveals that the quantity of Fe ions is below $1\times 10^{10}$ atoms/cm$^2$ that is thought unacceptable for the semiconductor fabrication process at a high temperature at which metal ion contamination needs to be avoided more strictly than at ordinary temperature, hence no problem. Thus, the high-temperature ultrapure water produced by the apparatus of the invention is found suitable for cleaning wafers in the semiconductor fabrication process. The above result also indicates that the use of a heat exchanger of SUS as the cooling heat exchanger 25 and a heat exchanger of titanium as the product water heat exchanger 24 entails no problem.

With reference to Table 4 and the preceding Table 1, the Fe concentration of pure water was measured by inductively coupled plasma mass spectrometry using SPQ-8000 (high sensitivity specs), manufactured by Seiko Denshi Kogyo Co. Ltd., and the wafer surface Fe analysis was made by total reflection fluorescent X-ray analysis using TREX 610T, manufactured by Tekunosu Co., Ltd.

The pure water immersion test was conducted with use of wafers as test pieces by immersing the wafer in an overflow pure water bath at a specified temperature (ordinary temperature or high temperature) and thereafter drying the wafer with a spin dryer for measurement. The RCA test by rinsing at ordinary temperature was conducted with use of wafers as test pieces by immersing the wafer in a solution of $H_2SO_4$/$H_2O_2$, then in an overflow pure water bath of ordinary temperature, then in a solution of $NH_4OH/H_2O_2/H_2O$, subsequently in an overflow pure water bath of ordinary temperature, further in a solution of $HCl/H_2O_2/H_2O$ and further in an overflow pure water bath of ordinary temperature, and thereafter drying the wafer with a spin dryer for measurement. For the RCA test by rinsing at a high temperature, the same procedure as for the test by rinsing at ordinary temperature was repeated except that the pure water bath of ordinary temperature was replaced by pure water bath of high temperature. The RCA+HF test by rinsing at ordinary temperature was conducted by treating test piece wafers in the same manner as for the RCA test by rinsing at ordinary temperature, further immersing the wafers in a dilute hydrofluoric acid solution and then in an overflow pure water bath of ordinary temperature, and thereafter drying the wafers with a spin dryer for measurement. The RCA+HF test by rinsing at a high temperature was conducted by treating test piece wafers in the same manner as for the RCA test by rinsing at a high temperature, further immersing the wafers in a dilute hydrofluoric acid solution and then in an overflow pure water bath of high temperature, and thereafter drying the wafers with a spin dryer for measurement.

Figure 2:
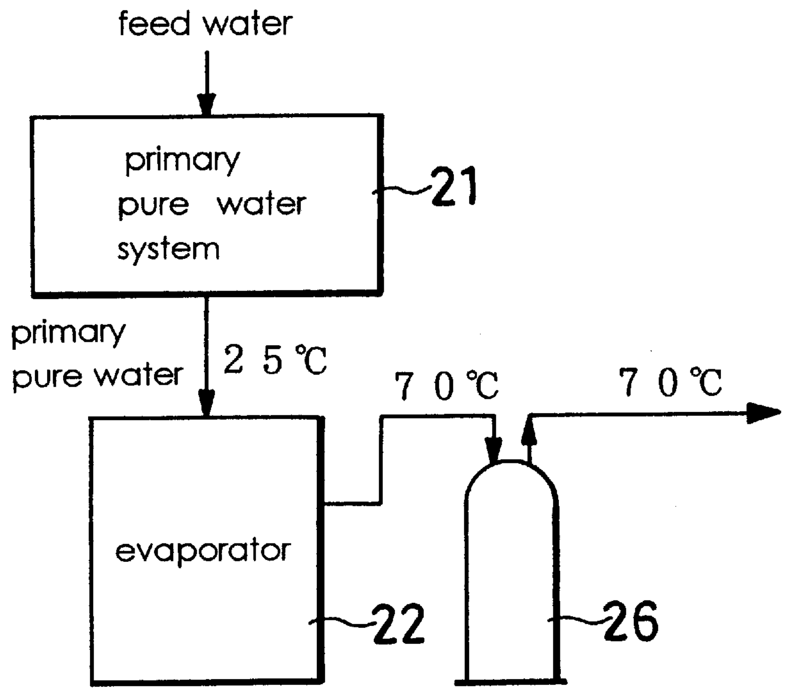
FIG. 2 is a flow chart showing a second embodiment of high-temperature ultrapure water production apparatus of the invention.

FIG. 2 shows a second embodiment of high-temperature ultrapure water production apparatus of the invention. This apparatus differs from the first embodiment in that the two heat exchangers 24, 25 are both omitted. Accordingly, an ion exchanger 26 is packed with a mixedbed ion exchange resin or strongly acidic cation exchange resin having heat resistance. With this apparatus, the ultrapure water having a high temperature of 75° C. and obtained by the evaporator 22 is passed through the heat-resistant mixed-bed ion exchange resin or heat-resistant strongly acidic cation exchange resin of the ion exchanger 26 while being held at the high temperature, whereby metal ions are removed from the water to give an extremely low ion content thereto, affording ultrapure water having a high temperature of 75° and a quality equivalent to the analyzed quality of the water at the product water heat exchanger outlet as listed in Table 3.

The high-temperature ultrapure water produced by the apparatus of the present invention has a low dissolved oxygen concentration with trace metal ions removed therefrom and is therefore usable not only as a rinse for washing away treating liquids but also as a chemical liquid for inhibiting the natural oxide film on Si surfaces, etching such surfaces or removing metal impurities from natural oxide film surfaces. In this case, the high-temperature ultrapure water produced by the apparatus of the invention is supplied directly to processing apparatus.

Next, a description will be given of embodiments of chemical liquid preparation systems for use in the case where the high-temperature ultrapure water produced by the water production apparatus of the invention serves as a chemical liquid.

Figure 9:
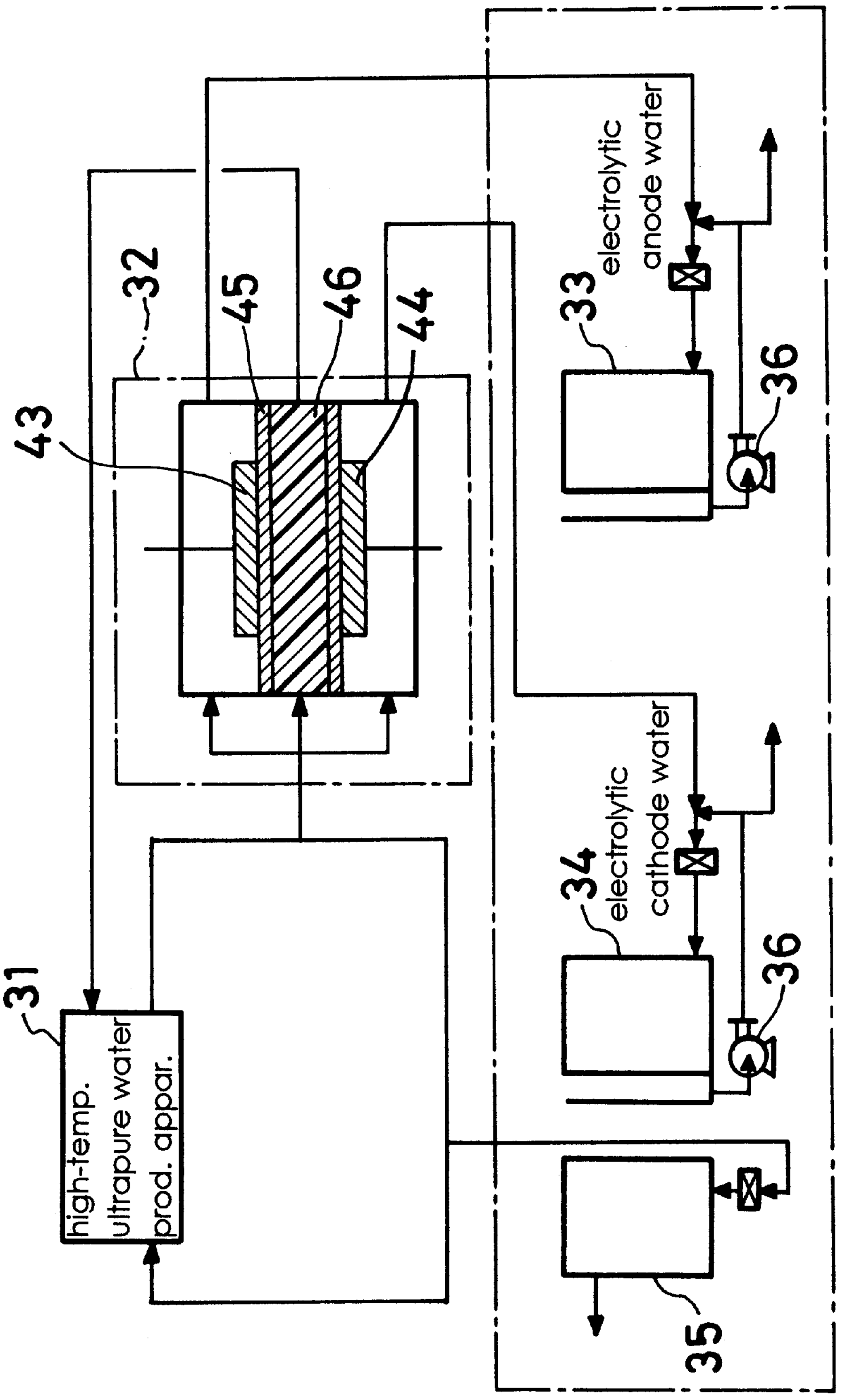
FIG. 9 is a flow chart showing a first embodiment of chemical liquid preparation system of the invention.

FIG. 9 shows a first embodiment of chemical liquid preparation system of the invention. With reference to this drawing, the system comprises a high-temperature ultrapure water production apparatus 31 of the invention, and an electrolytic ionized water production device 32 for passing therethrough the high-temperature ultrapure water as held a high temperature and produced by the apparatus 31 to prepare high-temperature electrolytic ionized water. The ionized water production device 32 comprises an anode 43, a cathode 44, opposed ion exchange membranes 45 and an ion exchange resin 46 packed in a space between the membranes 45, the membranes 45 and the resin 46 being sandwiched between the electrodes 43, 44. The ultrapure water produced by the ultrapure water production apparatus 31 of the invention is passed, as held at the high temperature, through the ionized water production device 32, whereby high-temperature electrolytic ionized water (electrolytic anode water and electrolytic cathode water) can be obtained. The anode water is supplied to a chemical liquid tank 33 equipped with a first circulating pump 36, the cathode water to a chemical liquid tank 34 equipped with a second circulating pump 36, and the high-temperature ultrapure water to an ultrapure water rinse tank 35.

Figure 10:
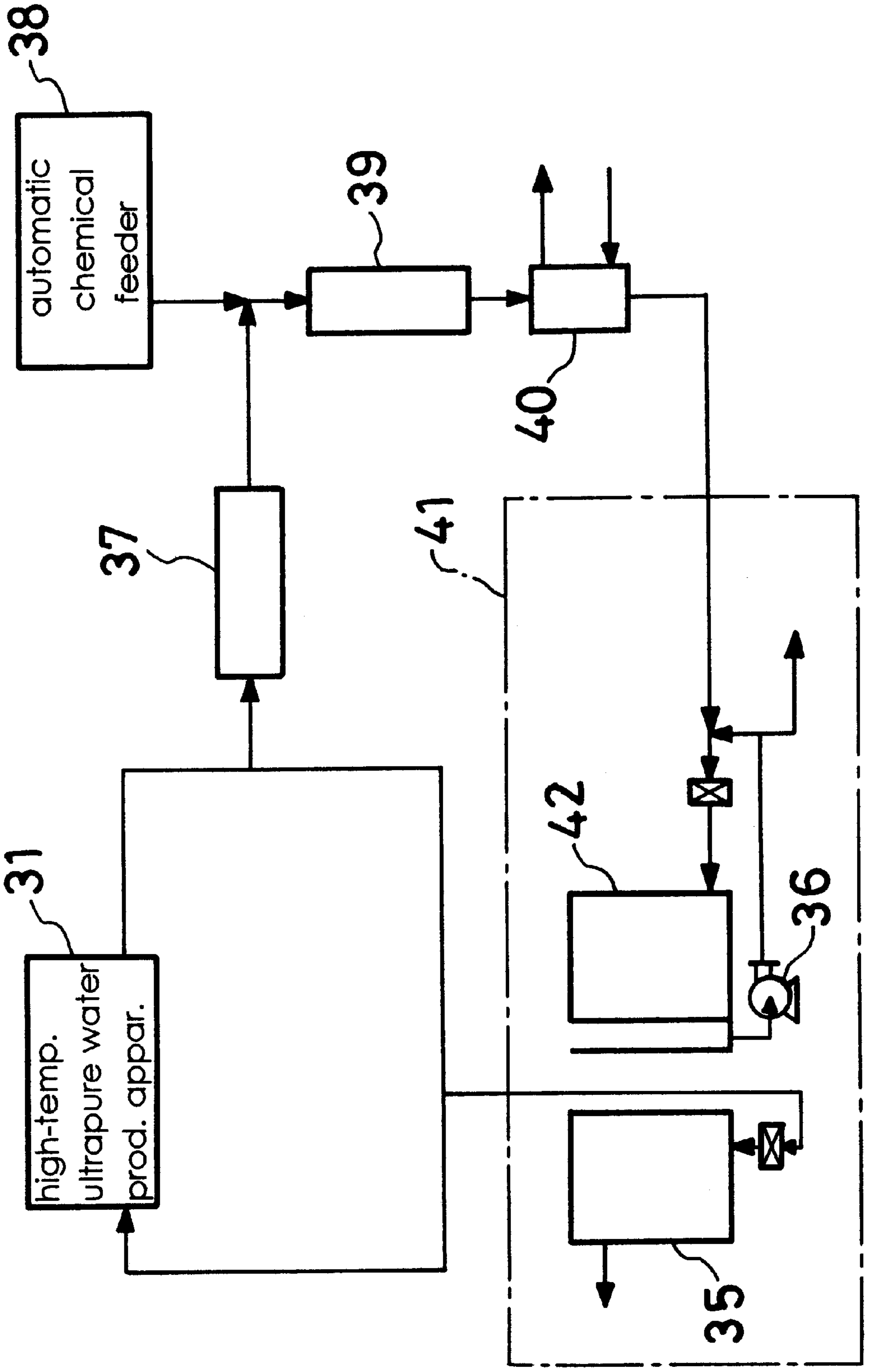
FIG. 10 is a flow chart showing a second embodiment of chemical liquid preparation system of the invention.

FIG. 10 shows a second embodiment of chemical liquid preparation system of the invention. With reference to this drawing, the system comprises a high-temperature ultrapure water production apparatus 31 of the invention, a water feeder 37 for supplying the high-temperature ultrapure water produced by the apparatus 31 at a constant flow rate, an automatic chemical feeder 38 for supplying a chemical at a constant flow rate, a mixer 39 for mixing the high-temperature ultrapure water and the chemical together, and a temperature-adjusting heat exchanger 40 for heating or cooling to a desired temperature the resulting chemical liquid having a desired concentration.

The high-temperature ultrapure water produced by the apparatus 31 and the chemical are supplied to a location upstream from the mixer 39 respectively by the water feeder 37 and the chemical feeder 38 at respective flow rates in such a ratio as to give the desired concentration, and are completely mixed together by the mixer 39. The mixer 39 is preferably a line mixer which eliminates the need to provide a specific feeder for the chemical liquid as adjusted to the desired concentration, but may comprise a storage tank provided with an agitator and a pump. The chemical may be supplied from its stock tank by forced feeding with nitrogen gas. The chemical liquid of desired concentration prepared is adjusted to the desired temperature by the heat exchanger 40 disposed downstream from the mixer 39. The chemical liquid adjusted to the desired concentration, if lower than the desired temperature, is heated by the heat exchanger 40, whereas if higher than the desired temperature, the chemical liquid as adjusted to the desired concentration is cooled by the heat exchanger 40. Other heating methods include electric heating and steam heating. For cooling, cold water from a cooling tower or chiller may alternatively be used. The chemical liquid adjusted to the desired concentration and the desired temperature is continuously supplied at a constant flow rate to a chemical liquid tank 42 equipped with a circulating pump 36 and included in a cleaner 41. The high-temperature ultrapure water is supplied to a ultrapure water rinse tank 35. The chemical liquid in the tank 42 is continuously drawn off from the discharge side of the pump 36 at a rate equal to the rate of supply. The rate of supply of the chemical liquid to the tank 42 is determined from the relationship of the yield of the product with the quantity of wafers treated or with the concentration of contaminants in the tank 42 corresponding to the quantity of wafers treated.

Figure 11:
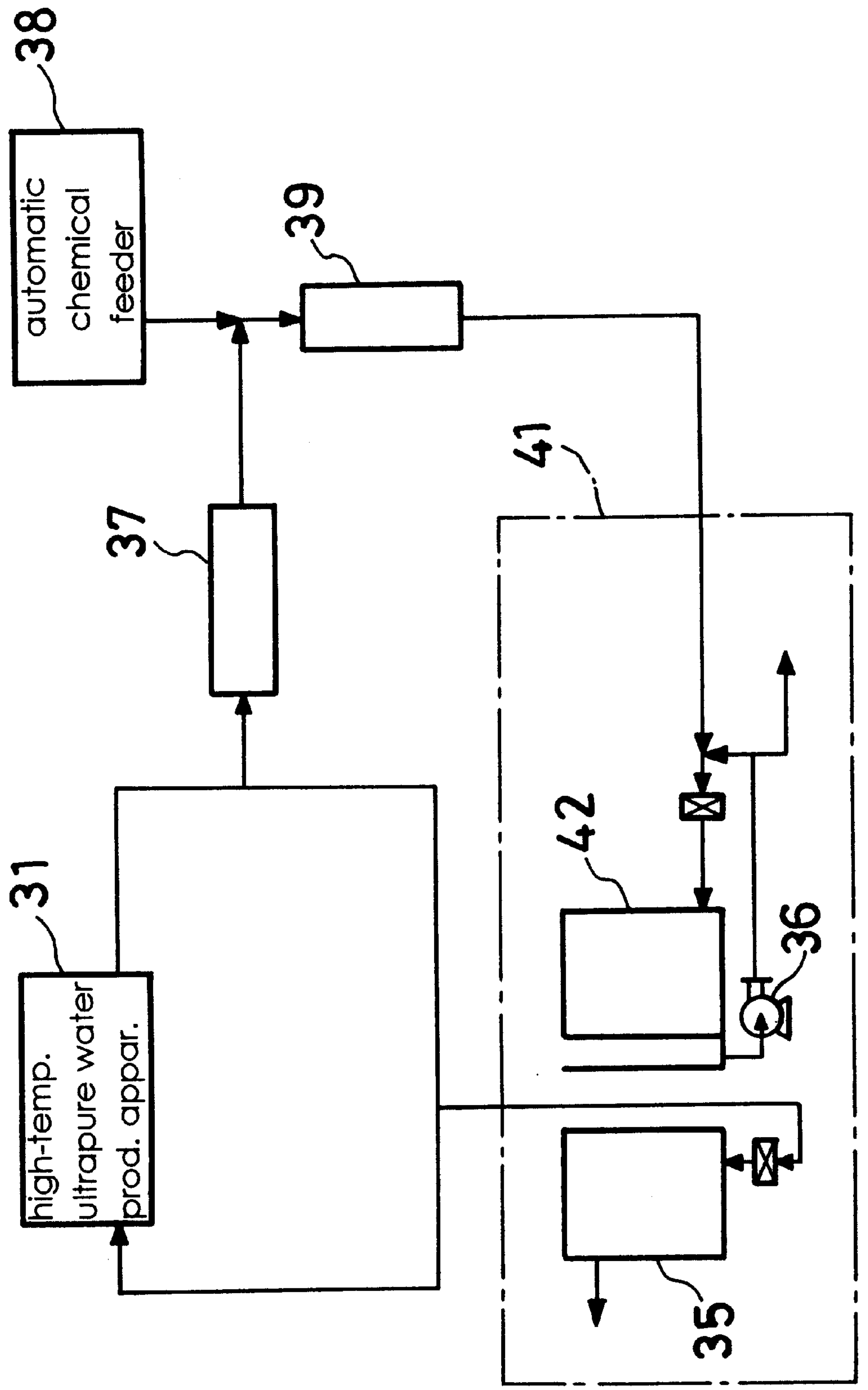
FIG. 11 is a flow chart showing a third embodiment of chemical liquid preparation system of the invention.

FIG. 11 shows a third embodiment of chemical liquid preparation system of the invention. This system differs from the second embodiment in that the temperature-adjusting heat exchanger 40 is omitted as seen in the drawing. With this system, the high-temperature ultrapure water produced by the high-temperature ultrapure water production apparatus 31 and a chemical are supplied to a location upstream from the mixer 39 respectively by the water feeder 37 for supplying high-temperature ultrapure water at a constant rate and the automatic chemical feeder 38 at respective flow rates in such a ratio as to give a desired concentration, and are completely mixed together by the mixer 39 to obtain a chemical liquid of desired temperature. In the drawings showing second and third embodiments, like parts are designated by like reference numerals and are not described repeatedly.

Figure 12:
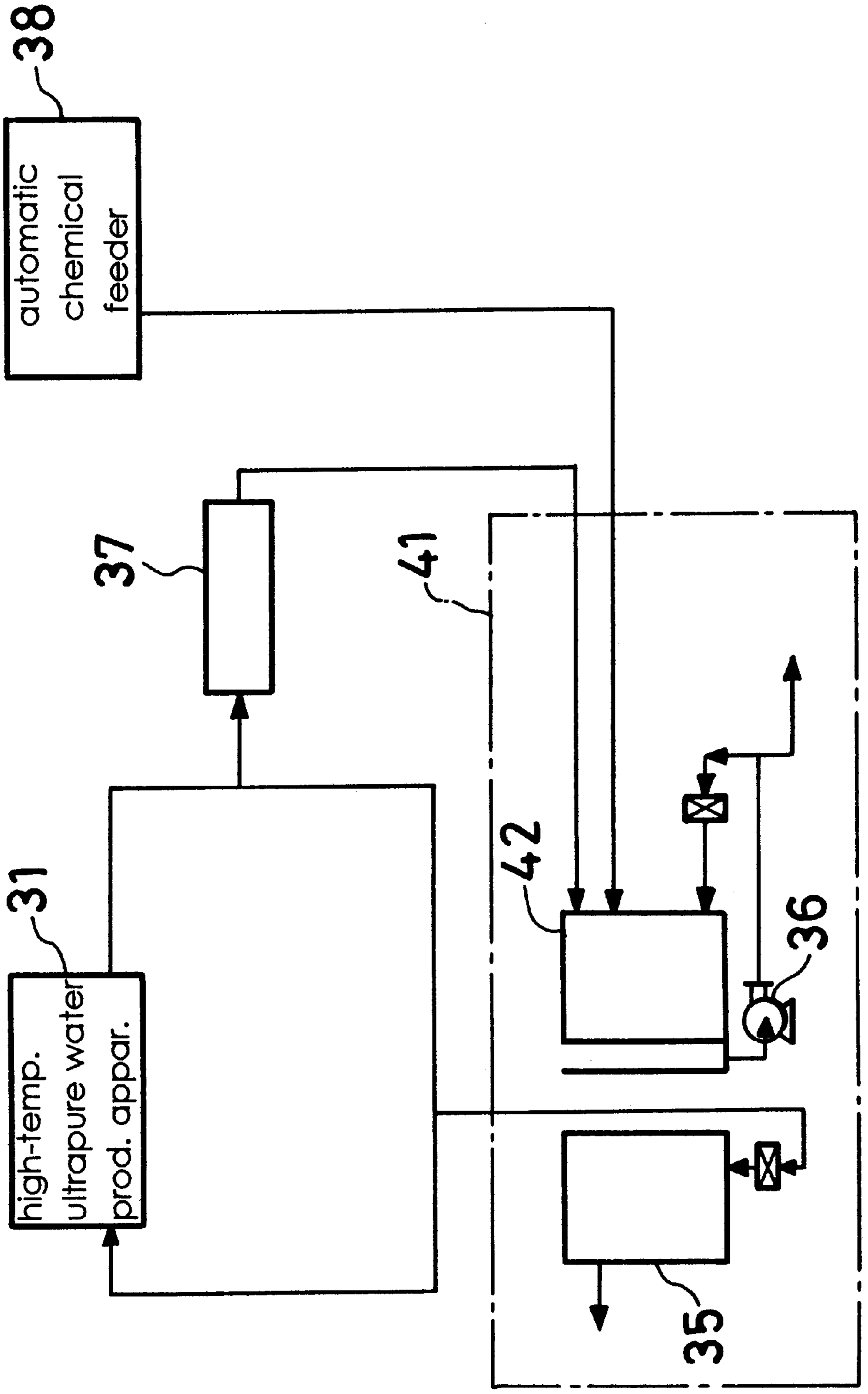
FIG. 12 is a flow chart showing a fourth embodiment of chemical liquid preparation system of the invention.

FIG. 12 shows a fourth embodiment of chemical liquid preparation system of the invention. With reference to the drawing, this system has no mixer 39. The high-temperature ultrapure water produced by the high-temperature ultrapure water production apparatus 31 of the invention and a chemical are supplied directly to a chemical liquid tank 42 equipped with a circulating pump 36 and included in a cleaner 41 respectively by a water feeder 37 for supplying high-temperature ultrapure water at a constant rate and an automatic chemical feeder 38 at respective flow rates in such a ratio as to give a desired concentration.

Also in the case of the chemical liquid preparation system of the present invention, the chemical agents to be mixed with the high-temperature ultrapure water are not limited to liquid chemicals; among the chemical products, for example, for use in cleaning wafers in the semiconductor fabrication process, the material gas or oxidizing gas to be stored and supplied in the form of a gas may be directly forced, as it is, into the high-temperature ultrapure water produced by the apparatus 31 of the invention and mixed therewith, in such a ratio as to obtain a desired concentration and then supplied at a desired temperature.

Industrial Applicability

As described above, the high-temperature ultrapure water production apparatus embodying the invention is suitable for preparing ultrapure water having a high temperature and a remarkable effect to improve the rinsing efficiency and drying efficiency in cleaning wafers in the semiconductor fabrication process.

What is claimed is:

1. A high-temperature ultrapure water production apparatus comprising a multi-effect evaporator comprising metallic evaporation tubes for treating pretreated water obtained by direct filtration and deaeration, or primary pure water obtained by a primary pure water system to prepare ultrapure water having a high temperature, and an electric deionizing ion exchanger of the continuous water passage type for removing trace metal ions from the ultrapure water obtained by the multi-effect evaporator, wherein dissolving-out preventing treatment is not performed in fabricating the evaporation tubes, which therefore lack a significant internal oxidation layer.

2. A high-temperature ultrapure water production apparatus according to claim 1 wherein the ion exchanger is packed with a mixed-bed ion exchange resin or strongly acidic cation exchange resin.

3. A high-temperature ultrapure water production apparatus according to claim 1 wherein the ion exchanger is packed with an ion exchange membrane or ion exchange fiber.

4. A high-temperature ultrapure water production apparatus according to any one of claims 1 to 3 which further comprises a product water heat exchanger for subjecting to heat exchange the high-temperature ultrapure water obtained by the evaporator and containing the trace metal ions unremoved therefrom and the ultrapure water having ordinary temperature and having its trace metal ions removed by treatment by the ion exchanger, to thereby cool the high-temperature ultrapure water containing the unremoved trace metal ions before feeding to the ion exchanger and heat the ordinary-temperature ultrapure water made free from the trace metal ions.

5. A high-temperature ultrapure water production apparatus according to claim 4 which further comprises a cooling heat exchanger for cooling to not higher than 40° C. the ultrapure water containing the unremoved trace metal ions and cooled by the product water heat exchanger for use as feed water for the ion exchanger.

6. A high-temperature ultrapure water production apparatus according to claim 5 wherein the cooling heat exchanger has a liquid contact portion made from stainless steel, titanium, oxidation-passivated stainless steel obtained by electrolytic polishing and subsequent special heat treatment or oxidation-passivated stainless steel obtained by electrolytic combination polishing and subsequent special heat treatment.

7. A high-temperature ultrapure water production apparatus according to claim 4 wherein the product water heat exchanger has a liquid contact portion made from titanium, oxidation-passivated stainless steel obtained by electrolytic polishing and subsequent special heat treatment or oxidation-passivated stainless steel obtained by electrolytic combination polishing and subsequent special heat treatment.

8. A high-temperature ultrapure water production apparatus according to claim 1 wherein the ion exchanger is packed with a heat-resistant mixed-bed ion exchange resin, heat-resistant strongly acidic cation exchange resin, heat-resistant ion exchange membrane or heat-resistant ion exchange fiber.

* * * * *

UNITED STATES PATENT AND TRADEMARK OFFICE

CERTIFICATE OF CORRECTION

PATENT NO. : 6,562,205 B1
DATED : May 13, 2003
INVENTOR(S) : Ban et al.

It is certified that error appears in the above-identified patent and that said Letters Patent is hereby corrected as shown below:

Title page,
Item [73], Assignee, should read as follows:
-- [73] Assignee: Mitsubishi Denki Kabushiki Kaisha,
Tokyo (JP)

and

Hitachi Zosen Corporation,
Osaka, (JP) --

Signed and Sealed this

Second Day of March, 2004

JON W. DUDAS
*Acting Director of the United States Patent and Trademark Office*